US006016309A

United States Patent [19]

Benayoun et al.

[11] Patent Number: 6,016,309

[45] Date of Patent: Jan. 18, 2000

[54] APPARATUS FOR AN AUTOMATIC SPEED AND DATA LENGTH SELECTION OF AN ASYCHRONOUS DATA LINK

[75] Inventors: Alain Benayoun, Cagnes/Mer; Jean-Francois Le Pennec, Nice; Patrick Michel, La Gaude, all of France

[73] Assignee: International Business Machines Corporation, Armonk, N.Y.

[21] Appl. No.: 08/751,800

[22] Filed: Nov. 19, 1996

[30] Foreign Application Priority Data

Nov. 21, 1995 [EP] European Pat. Off. .............. 95480169

[51] Int. Cl.[7] ........................................................ H04J 3/14

[52] U.S. Cl. .......................... 370/252; 370/230; 370/235; 370/465

[58] Field of Search .................................... 370/241, 252, 370/465, 468, 218, 230, 235, 434, 257; 371/5.4, 20.1, 20.4, 22.4

[56] References Cited

U.S. PATENT DOCUMENTS

| | | | |
|---|---|---|---|
| 4,545,011 | 10/1985 | Lyon et al. | 364/200 |
| 5,222,062 | 6/1993 | Sharma et al. | 370/218 |
| 5,222,081 | 6/1993 | Lewis et la. | 375/117 |
| 5,226,040 | 7/1993 | Noble, Jr. et al. | 370/465 |
| 5,463,616 | 10/1995 | Kruse et al. | 370/468 |

FOREIGN PATENT DOCUMENTS

| | | | |
|---|---|---|---|
| 0669738 | 12/1993 | European Pat. Off. | H04L 25/02 |
| 0601216 | 6/1994 | European Pat. Off. | H04L 25/02 |

OTHER PUBLICATIONS

European Search Report.

*Primary Examiner*—Douglas W. Olms
*Assistant Examiner*—Shick Hom

[57] ABSTRACT

To establish the communication between two devices connected through an asynchronous data link, an adapter for automatically identifies configuration parameters. The configuration parameters may be the transmission speed, the data bits length (seven or eight), the parity (odd or even) if existing and the number of stop bits (one or two). Thus, there are six combinations of the four parameters. Each one of the configuration is detected by an adapter which is independent from the others. It comprises a control circuit (170) receiving deserialized data bits signal (RXD) from a connector (120), a clock generator (160) for generating clock signals and varying the clock frequency so as to adapt to asynchronous data transmission speed, a timer (220) for synchronizing the number of data bytes so as to adapt to the data bit length and counters for counting the number of times a predetermined configuration matches. A parity checker may be also implemented in case a parity bit is used in the data transmission. The six adapters may be connected in parallel by the RXD signal so that each adapter operates simultaneously so that each counter may inform first the microcontroller of the configuration detected once it is sure this configuration is not randomly detected.

6 Claims, 15 Drawing Sheets

MICRO CONTROLLER
DO-D7
X1
X2
CS
WR
RD
DMA REQ1
DMA REQ2
DMA ACK1
DMA ACK2
TxD
RST
IN21-22
IN17-20
IN13-16
RxD
IN1
IN2
IN3
IN4
IN5
IN6
OUT2
IN7
IN8
IN9
IN10
IN11
IN12
OUT1
IN23-28
IN29-32
IN33-36
TIMER3
COUNTER5
COUNTER6
COUNTER7
COUNTER8
TIMER4
CONTROL3
CONTROL4
CLOCK GENE3
PARITY CHK
8 Bit EVEN
CLOCK GENE4

APPARATUS FOR AN AUTOMATIC SPEED AND DATA LENGTH SELECTION OF AN ASYCHRONOUS DATA LINK

TECHNICAL FIELD OF THE INVENTION

The present invention relates to a data communication system and more particularly to an apparatus for automatically selecting configuration parameters of an asynchronous data link.

BACKGROUND ART

When two asynchronous devices are connected together for the first time, it is very seldom to have a good data transmission because the asynchronous configuration of both devices are different, especially when there is no clocking signal. The four parameters of the asynchronous configuration that are to be adapted are the followings: the transmission speed, the data length, the parity if existing (even or odd), and the number of stop bits. Many cases exist depending on the combination of these parameters.

Up to now, it is necessary to know in advance the parameters of the configuration before starting the communication. The access to the documentation of the devices is difficult and sometimes impossible. Moreover, before accessing the device, it is necessary to break it down and to set the hardware parameters (jumpers etc. . . .). Therefore, there is a desire to facilitate the configuration of the parameters by implementing an adapter which can learn the configuration by reading the incoming data and which automatically set the correct parameters of the asynchronous communication link.

An asynchronous transmission is characterized by two leads, a transmit and receive lead (no clock lead). The structure of this communication is the following. When no communication occurs, a mark (high level) is on the line. This state is an idle state. When an information is to be transmitted, a start bit (low level) is sent and it synchronizes the beginning of the communication. Then, the transmission of the data bytes begins by starting to send the LSB (least significant bit). This byte is of several data bits such as 7 or 8 data bits length (the case of 9 bits length is seldom). The LSB is followed by the MSB (most significant bit). At the end of the MSB transmission, a parity bit is optionally inserted, it may be odd or even. One or two stop bits may also be sent after this optional parity bits which represent the end of the transmission. Once the transmission is completed, the line is set to idle state with a mark (high level).

The four parameters are then to be detected by an asynchronous adapter in order to establish the communication between two asynchronous devices.

SUMMARY OF THE INVENTION

The present invention has therefore the object to automatically adapt an asynchronous communication between two asynchronous devices.

More specifically, an object of the invention is to automatically adapt the transmission speed, the data length (seven or eight data bits) and the stop bits (one or two) which characterize an asynchronous transmission.

Another object of the invention is to detect the parity bit (odd, even) when existing.

An adapter according to the present invention is to be used in a communication network as is set in claim 1.

DETAILED DESCRIPTION OF THE PRESENT INVENTION

The adapter according to the present invention is implemented in any asynchonous communication link whose transmission rate is comprised between 110 bits per second and 19200 bits per second having 7 or 8 data bits, with odd or even parity or no parity and 1 or 2 stop bits.

The function of automatically selecting the configuration parameters according to the present invention can be implemented inside any asynchronous receiver such as a Data Terminal Equipment (DTE) or a Data Communication Equipment (DCE). It is to be noted that in an asynchronous transmission, as no clock is provided, the difference between a DTE and a DCE does no longer exist. Besides, this function can be implemented in a stand alone box connected between the DCE and DTE.

Figure 1:
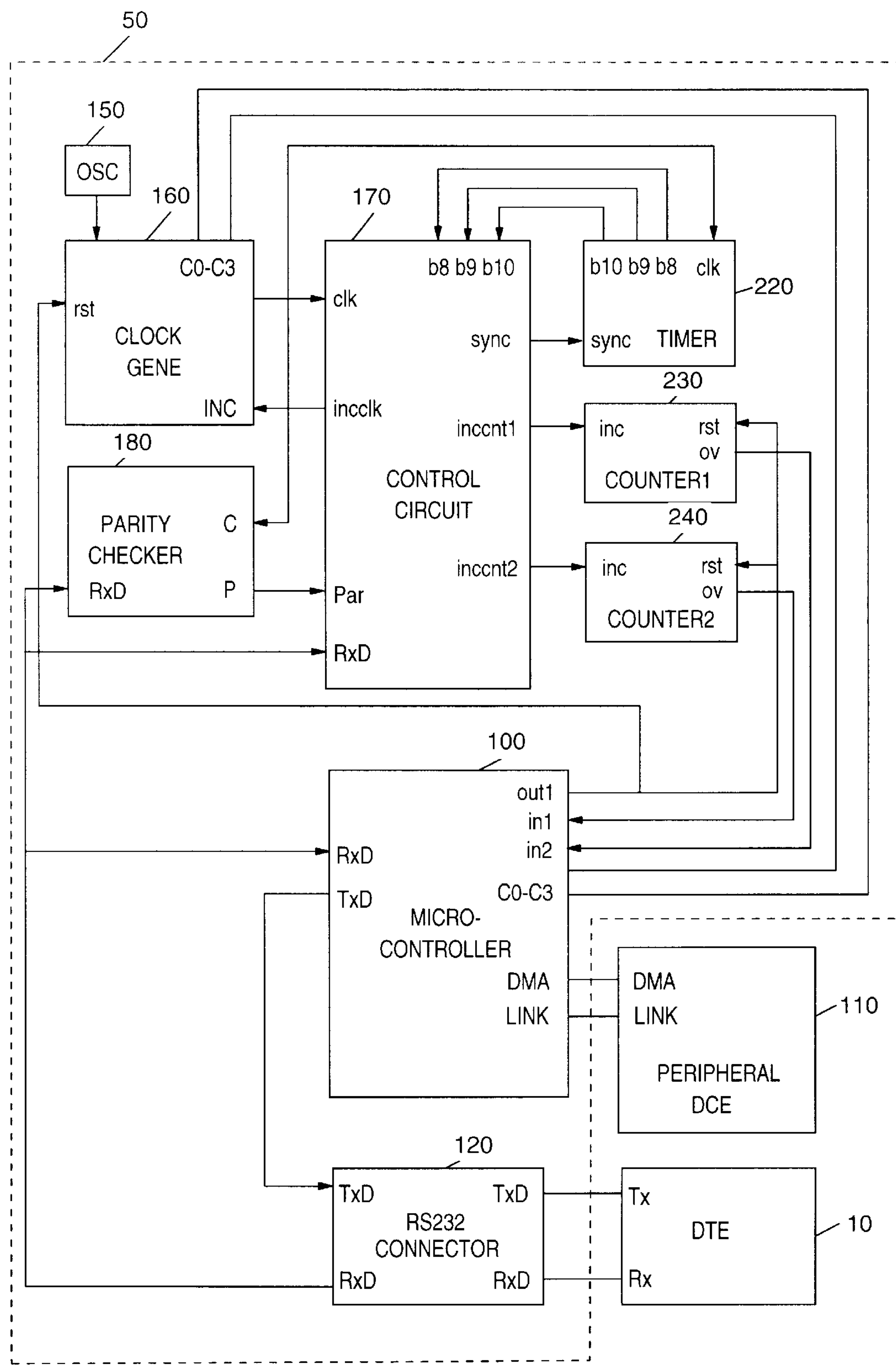
FIG. 1 represents an overview of the environment in which an asynchronous adapter according to the present invention is implemented.

FIG. 1 represents a simplified embodiment of the adapter for selecting a single configuration of 7 bit data length with a parity bit and one or two stop bit. This parity bit is to be chosen between even or odd.

A DTE (10) is connected by a receive and transmit pins referred as RXD and TXD to the adapter through a connector (120) which may be a RS 232 connector. Lead RXD is also connected to a control circuit (170) and a parity checker (180). A clock generator (160) is provided to the adapter and is set at the lowest speed of 110 bps at power on reset. At the beginning of the transmission, the bits are serially transmitted on lead RXD. The control circuit waits for the start bit signal which has a low level and as soon as it is detected, it sends a synchronous signal SYNC to a timer (220) to synchronize the beginning of the bit counting. This timer is also clocked at the lowest rate of 110 bps. Simultaneously, the parity checker (180) receives on its input pin RXD the received data which are deserialized. The parity checker calculates the parity of these seven bits and presents it on its output P to the control circuit in order to be checked. Then, at the 8th bit time which corresponds to B8 input equal to 1, the control circuit (170) compares the parity input signal received from the parity checker on its pin PAR to the incoming signal RXD. If the parity is good, it continues and waits for the 9th bit time which corresponds to B9 input equal to 1. If the RXD is equal to 1, which corresponds to the configuration of one stop bit, then the control circuit increments a first counter (230) through pin INCCNT1 and tests the B10 input. If once again at 10th bit time, the RXD is equal to 1, which corresponds to the configuration of two stop bits, it increments a second counter (240) through pin INCCNT2 and waits for the next start bit. These operations are repeated until one of both counters (230,240) reaches a predetermined value such as 10 for example. The number 10 arbitrary, it may lower or higher, its purpose is to determine that the configuration as detected is not hazardous. When the value of 10 is reached, its overflow pin 0V rises and the microcontroller is made aware of this information by input pin IN1 or IN2. Then, the microcontroller reads the speed of the asynchronous communication through its pin C0–C3. Its pins IN1 and IN2 determine if the configuration has one or two stop bits corresponding to the speed of the communication. Afterwards, the microcontroller resets the system and programs its receive and transmit internal UART to the speed rate of the clock generator, the data bit length, the parity, and the number of stop bits. The communication is then established between the connected device and the peripheral (110) connected to the UART of the microcontroller via its DMA link.

In case the parity test is bad or the RXD signal is equal to zero, or the start bit is found whereas a first or second stop bit is expected, the clock generator (160) is incremented by the control circuit through its INCCLK and the same process as described above is executed up to synchronize and to find the good transmission speed.

It should be kept in mind that in case it is a configuration with one stop bit, then only one counter is required and the 10th bit (after the synchronization of the bit counting) is not tested. And in case it is a configuration without a parity bit, then the bit corresponding to parity bit is not tested.

The other configurations are scanned by the other implementation of the circuits that are described in detail below in FIG. 2 or the three FIGS. 2A–C.

Hardware Description

Since the parameters of the asynchronous configuration may be the data length (7 or 8 data bits), the parity (odd or even or no parity) and the number of stop bits (one or two), there are six possible combinations. Therefore, in such case, six control circuits, six timers, six clock generators, four parity checkers and twelve counters are used.

Figure 2:
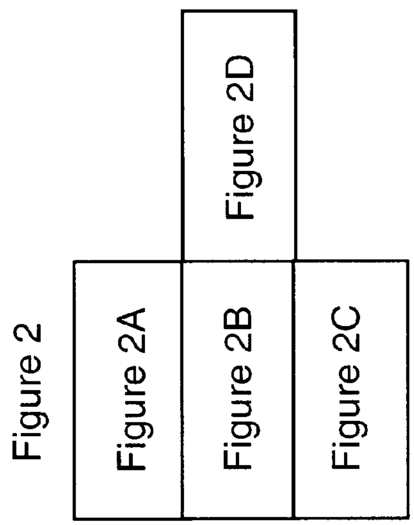
FIG. 2, consisting of FIGS. 2A, 2B and 2C, represents in detail the asynchronous adapter of the present invention.
Figure 2A:
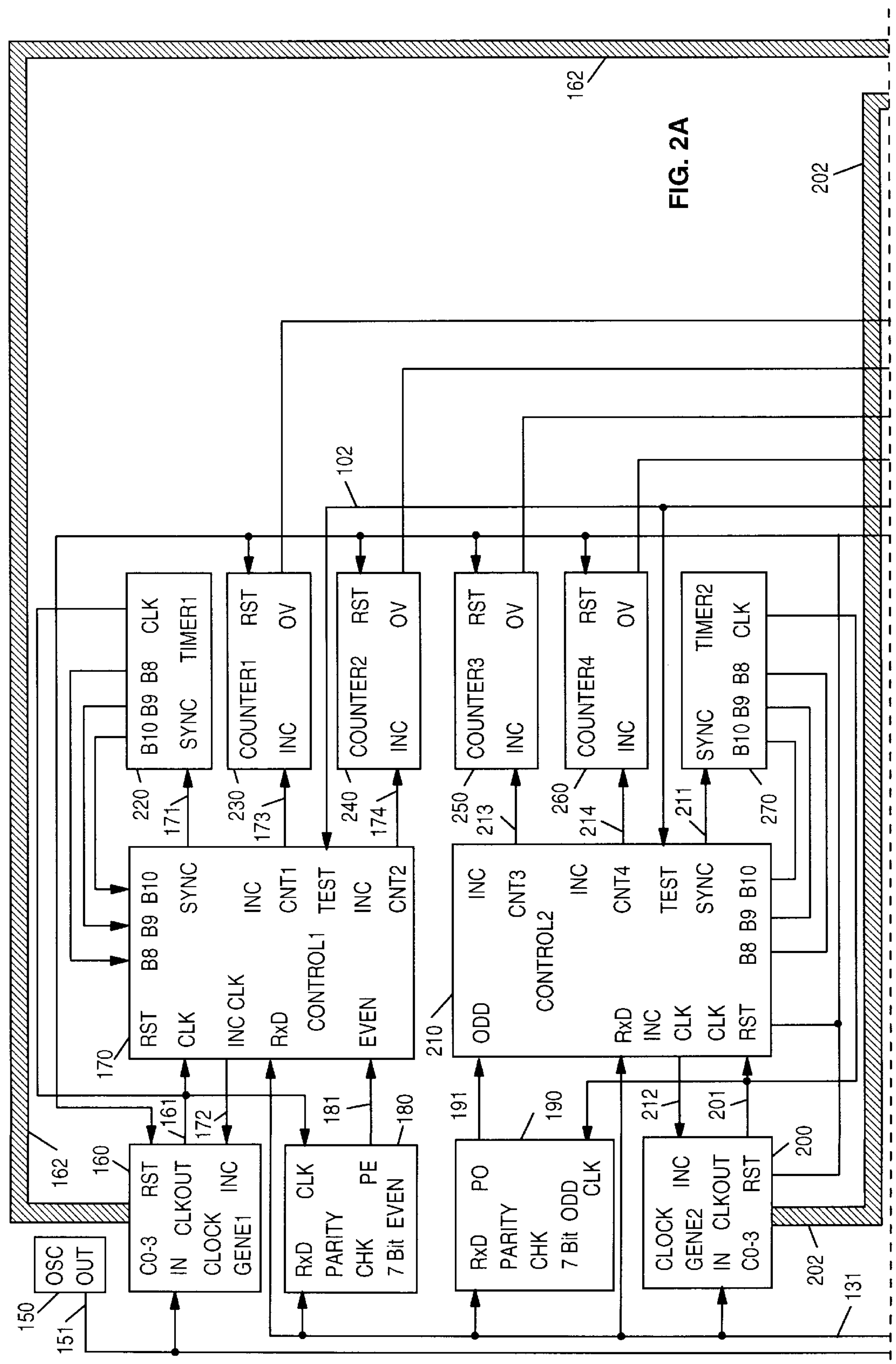
Figure 2B:
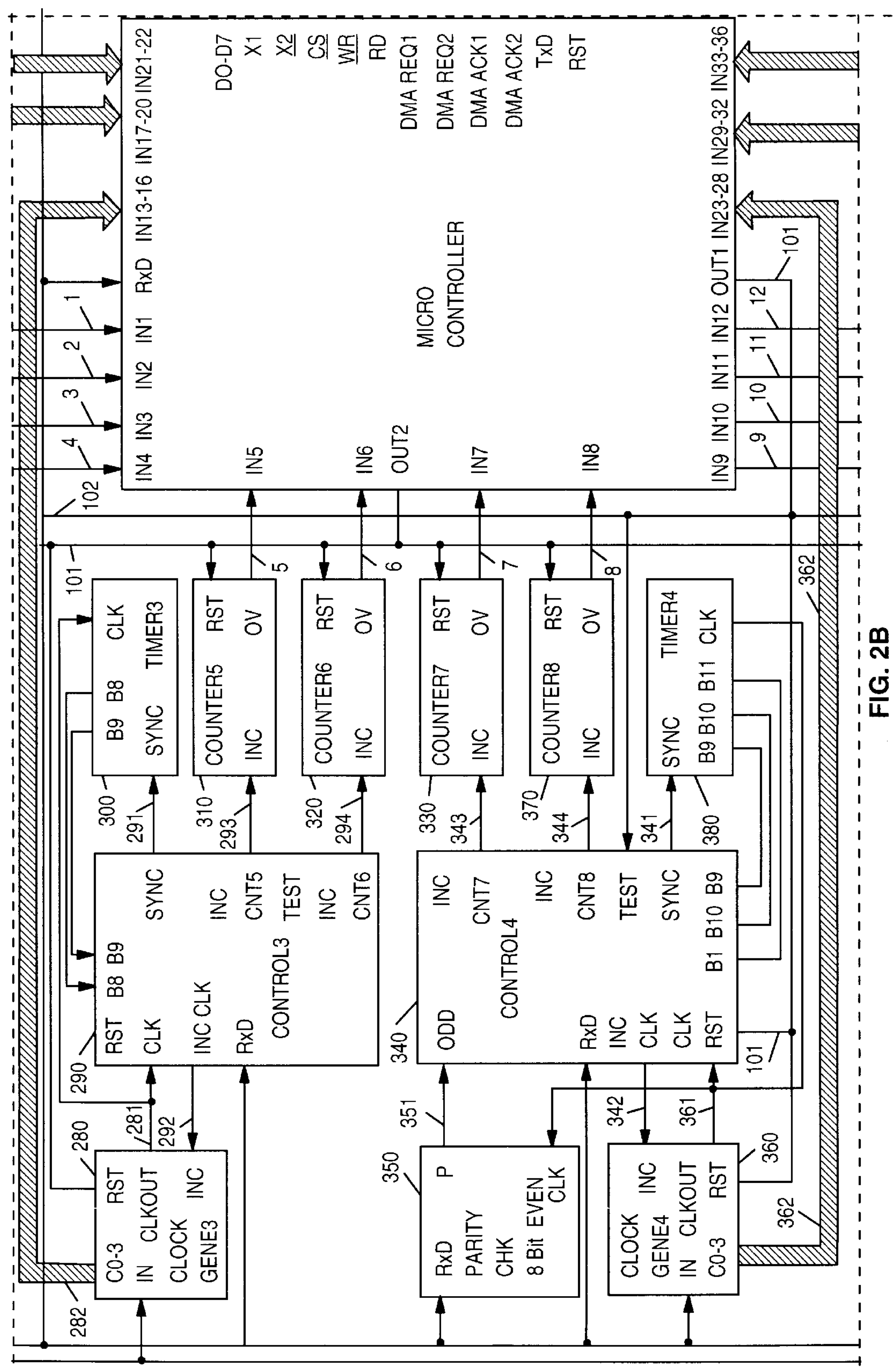
Figure 2C:
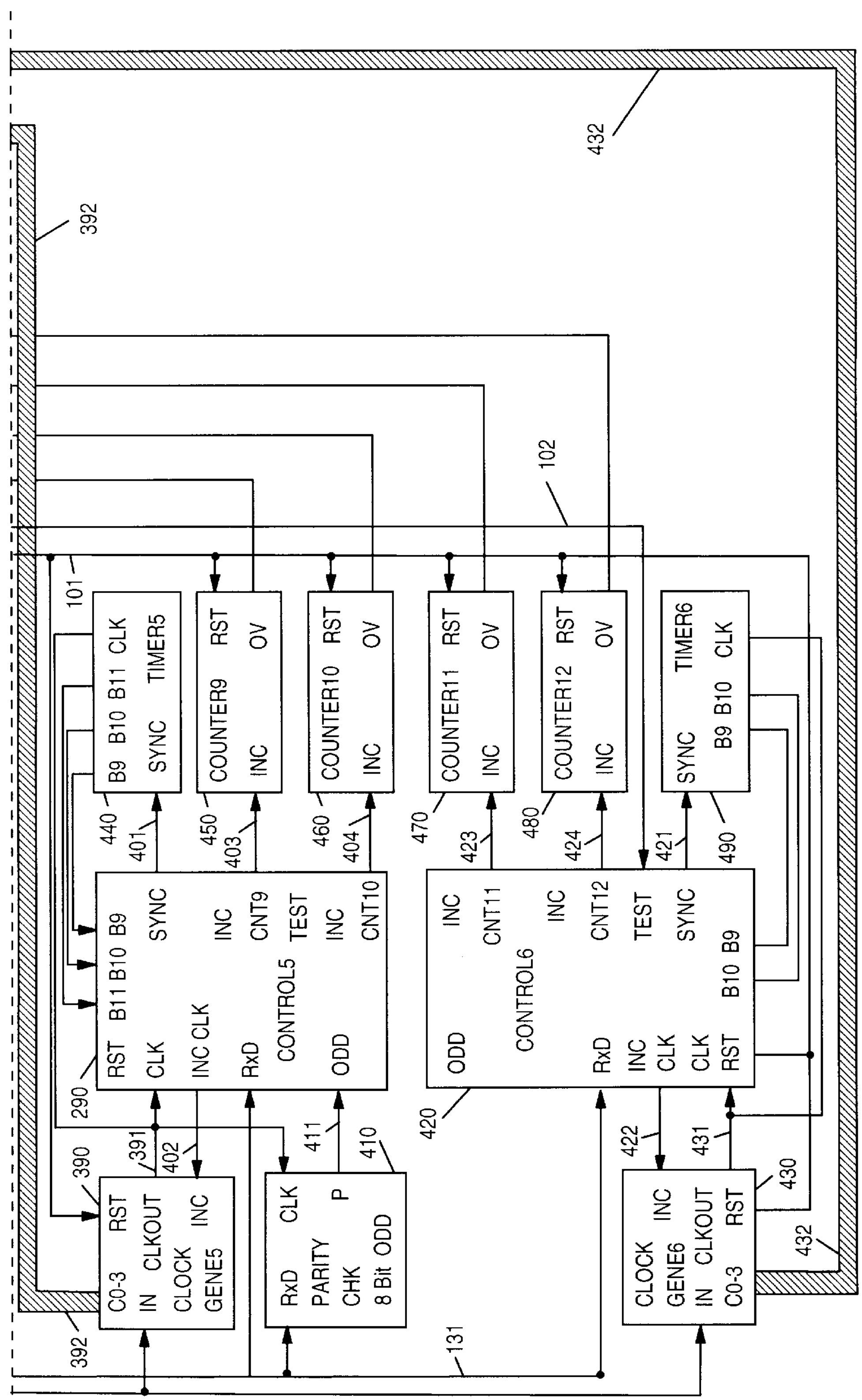
Figure 2D:
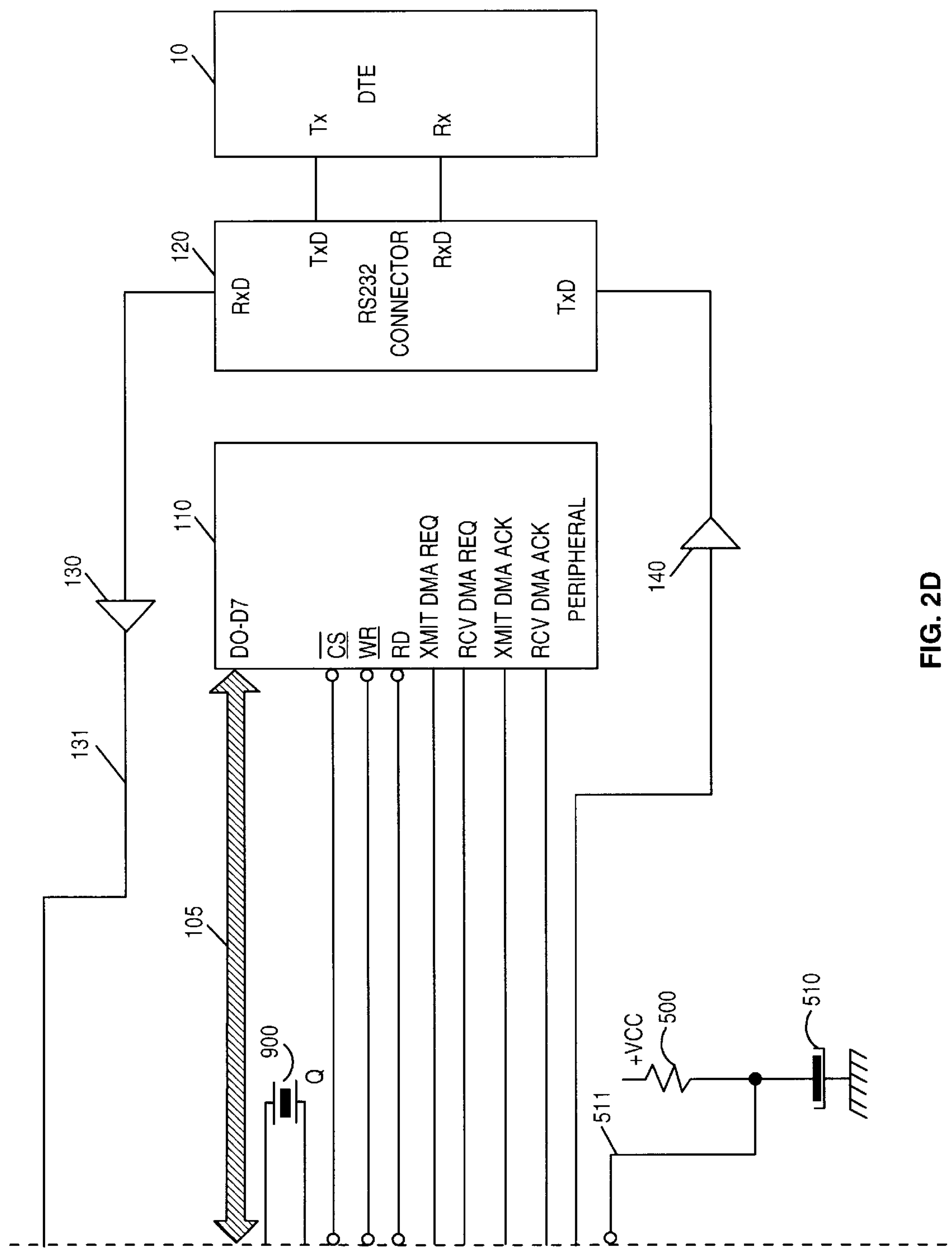

In FIG. 2, the microcontroller of the type ST9040 from THOMSON-SGS 100 is clocked by a quartz Q 900 through its inputs X1 and X2 at the frequency of 16 Mhz. It has twelve input/output (I/O) pins referred as IN1, . . . , IN12, respectively connected through leads 1 to 12 to outputs 0V of twelve counters referred as COUNTER1 230, COUNTER2 240, COUNTER3 210, COUNTER4 260, COUNTER5 310, COUNTER6 320, COUNTER7 330, COUNTER8 370, COUNTER9 450, COUNTER10 460, COUNTER11 470 and COUNTER12 480. An output pin OUT1 of the microcontroller 100 is connected through lead 101 to all reset pins RST of six clock generators referred as CLOCK GENE1 160, CLOCK GENE2 200, CLOCK GENE3 280, CLOCK GENE4 360, CLOCK GENE5 390 and CLOCK GENE6 430, of six control circuits referred as CONTROL1 170, CONTROL2 210, CONTROL3 290, CONTROL4 340, CONTROL5 400 and CONTROL6 420, and of the twelve counters. An output OUT2 of the microcontroller is connected through lead 102 to TEST pins of these six control circuits.

The six clock generators have outputs C0–C3 which are respectively connected by six 4-bit wide busses (162,202, 282,362,392,432) to inputs IN21–24, IN17–20, IN13–16, IN25–28, IN29–32 and inputs IN33–36 of the microcontroller 100. The six clock generators are also connected through lead 151 by their input pins IN to an output OUT of an OSCILLATOR 150. Output pins CLKOUT of the first, second, fourth and fifth clock generators (160,200,360,390) are respectively connected to input pins CLK of the first, second, fourth and fifth control circuits (170,210,340,400) , to input pins CLK of a first, second, fourth and fifth TIMER (220,270,380,440), and to input pins CLK of five parity checkers (180,190,350,410) through leads (161,201,361, 391). However, output pins CLKOUT of the third and sixth clock generators (280,430) are connected to input pins CLK of the third and sixth control circuits (290,420) and to input pins CLK of a third and sixth TIMER (300,490) through leads (281,431). Furthermore, the six clock generators respectively receive on their inputs INC incoming signals from output pins INC CLK of the six control circuits through leads (172,212,292,342,402,422).

The parity checkers (180,350) respectively have output pins P connected to inputs EVEN of the first and fourth control circuits (170,340). Conversely, the parity checkers (190,410) respectively have output pins P connected to inputs ODD of the second and fifth control circuits (210, 400).

The six control circuits (170,210,290,340,400,420) respectively have output pins SYNC connected input pins SYNC of the six TIMER (220,270,300,380,440,490). Each of the six control circuits also have two output pins, each one being connected to a timer. For instance, the output pins INC CNT1 and INC CNT2 are respectively connected to pins INC of the first and second counters (230,240) through leads (173,174). So are the pairs of output pins (INC CNT3,INC CNT4), (INC CNT5,INC CNT6), (INC CNT7,INC CNT8), (INC CNT9,INC CNT10) and (INC CNT11,INC CNT12) of the control circuits (210,290,340,400,420) which are respectively connected to pins INC of the other counters (250,260, 310,320,330,370,450,460,470,480). Besides, the first, second, fourth and fifth control circuits (170,210,340,400) have 3 input pins referred as BIT8, BIT9 and BIT10 which are respectively connected to pins BIT8,BIT9 and BIT10 of timers (220,270,380,440). The third and the sixth control circuits (290,420) have 2 input pins referred as BIT8 and BIT9 which are respectively connected to pins BIT8 and BIT9 of timers (300,490).

A Connector RS232 (120) has a receive pin RXD connected through lead (121) to the input of a receiver (130) whose output pin is connected to receive inputs RXD of the microcontroller (100), of the six control circuits (170,210, 290,340,400 and 420) and the four parity checkers (180, 190,350,410) through lead (131). The Connector RS232 also has a transmit pin TXD connected to an output of a driver (140) whose input is connected to a transmit output pin TXD of the microcontroller (100). The connector (120) is connected to pins TX and RX of the DTE (10) as mentioned above in FIG. 1.

A Peripheral (110) is connected to the microcontroller (100) via a data bus (105) by its eight pins D0–D7. A pin CS0 of the microcontroller is connected to a chip select pin CS of the peripheral (110). The microcontroller (100) also has a write and read pins (WR,RD) which are respectively connected to pins WR and RD of the peripheral (110). The microcontroller (100) has two DMA request pins referred as DMA_REQ1 and DMA_REQ2 respectively connected to pins XMIT_DMA_REQ and RCV_DMA_REQ pins of the peripheral (110). Conversely DMA acknowledge pins referred as DMA_ACK1 and DMA_ACK2 are respectively connected to pins XMIT_DMA_ACK and RCV_DMA_ACK of the peripheral.

The Power On Reset of the microcontroller (100) is performed through a RC divider constituted of a resistor (500) and a capacitor (510). One terminal of the resistor is connected to a voltage +VCC of a power supply, and the other terminal is connected to the capacitor 510 and to reset input pin RST of the microcontroller (100). The other terminal of the capacitor (510) is connected to the Ground of the power supply.

Functional Description

The asynchronous communication device (10) such as a DTE is connected to the connector (120). After power on reset, this device begins to send serial asynchronous data at an unknown speed. These bytes go to the microcontroller (100) through the receiver (130) for voltage level adaptation, to the six control circuits (170,210,290,340,400,420) and the four parity checkers (180,190,350,410). The six control circuits operate simultaneously and independently basing on different configuration parameters which are the transmission speed, the data length, the parity and stop bits. In the same time, the oscillator (150) feeds the six clock generators (160,200,280,360,390,430) which are automatically switched to 110 bits per second.

The six control circuits are dedicated to specific and different configuration parameters.

The first control circuit (170) monitors the asynchronous communication of 7 data bits with even parity and 1 or 2 stop bits. More particularly, the first and second counters (230, 240) respectively connected to the inputs IN1 and IN2 of the microcontroller (100) through its overflow output 0V are respectively dedicated to the case of one stop bit and two stop bits.

The second control circuit (210) monitors the asynchronous communication of 7 data bits with odd parity and 1 or 2 stop bits. More particularly, the third and fourth counters (250, 260) respectively connected to the inputs IN3 and IN4 of the microcontroller (100) through its overflow output 0V are respectively dedicated to the case of one stop bit and two stop bits.

The third control circuit (290) monitors the asynchronous communication of 7 data bits with no parity and 1 or 2 stop bits. More particularly, the fifth and sixth counters (310,320) respectively connected to the inputs IN5 and IN6 of the microcontroller (100) through its overflow output 0V are respectively dedicated to the case of one stop bit and two stop bits.

The fourth control circuit (340) monitors the asynchronous communication of 8 data bits with even parity and 1 or 2 stop bits. More particularly, the seventh and eight counters (330, 370) respectively connected to the inputs IN7 and IN8 of the microcontroller (100) through its overflow output 0V are respectively dedicated to the case of one stop bit and two stop bits.

The fifth control circuit (400) monitors the asynchronous communication of 8 data bits with odd parity and 1 or 2 stop bits. More particularly, the nine and tenth counters (450,460) respectively connected to the inputs IN9 and IN10 of the microcontroller (100) through its overflow output 0V are respectively dedicated to the case of one stop bit and two stop bits.

And finally, the sixth control circuit (420) monitors the asynchronous communication of 8 data bits with no parity and 1 or 2 stop bits. More particularly, the eleventh and twelfth counters (470,480) respectively connected to the inputs IN11 and IN12 of the microcontroller (100) through its overflow output 0V are respectively dedicated to the case of one stop bit and two stop bits.

The present invention may also be used in an asynchronous communication of 9 data bits length by adapting the state machines of the six control circuits and the associated timers, which consist in testing the three last data bits, for instance the 10th, 11th and 12th data bits. In such case, the following description may also be applied except for that the microcontroller and the data should be of 16 bits length to handle the 9 bits length transmit between the microcontroller and the peripheral.

At POR, the resistor (500) and the capacitor (510) generate a negative signal on lead (511) which is taken into account by the microcontroller (100) on its reset pin RST.

Once the microcontroller has run its Basic Assurance Test (BAT) and programmed its internal DMA, it sets on lead (101) its output OUT1 to 1 in order to reset the six control circuits, the twelve counters and the six clock generators. Then, the microcontroller resets its output OUT1 to 0 and sets its output OUT2 to 1 through lead (102) to the Test inputs of the six control circuits in order to switch them to the test mode.

Figure 3A:
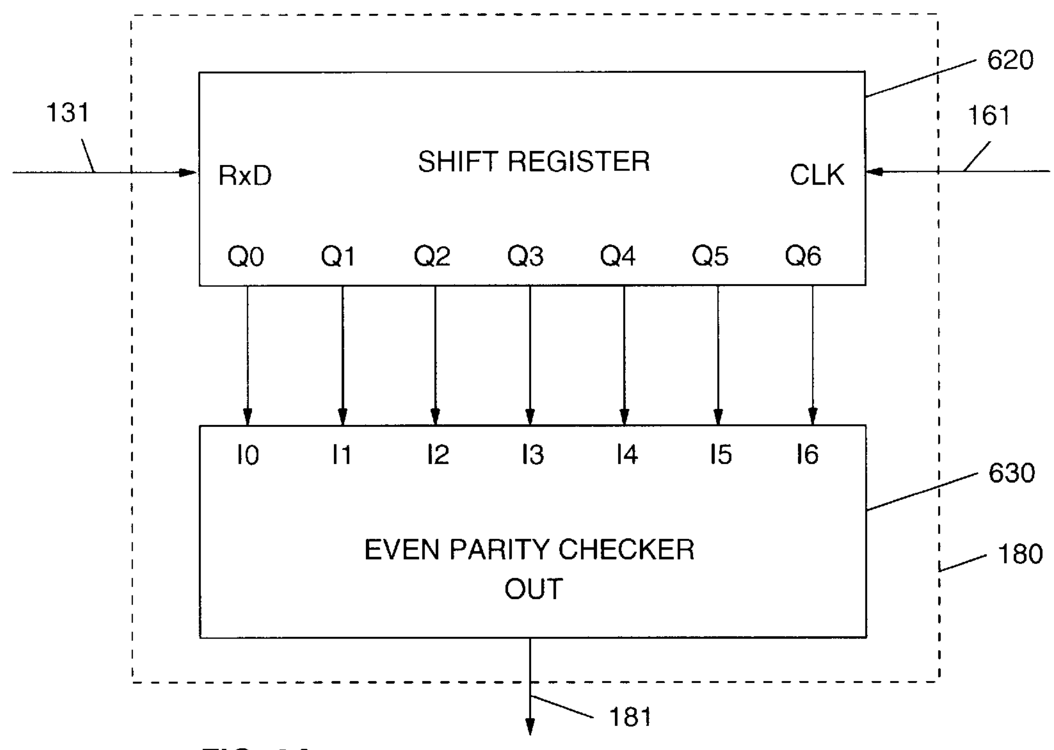
FIGS. 3-A and 3-B respectively represent an even and odd parity checkers in the case of a 7 data bits length.
Figure 3B:
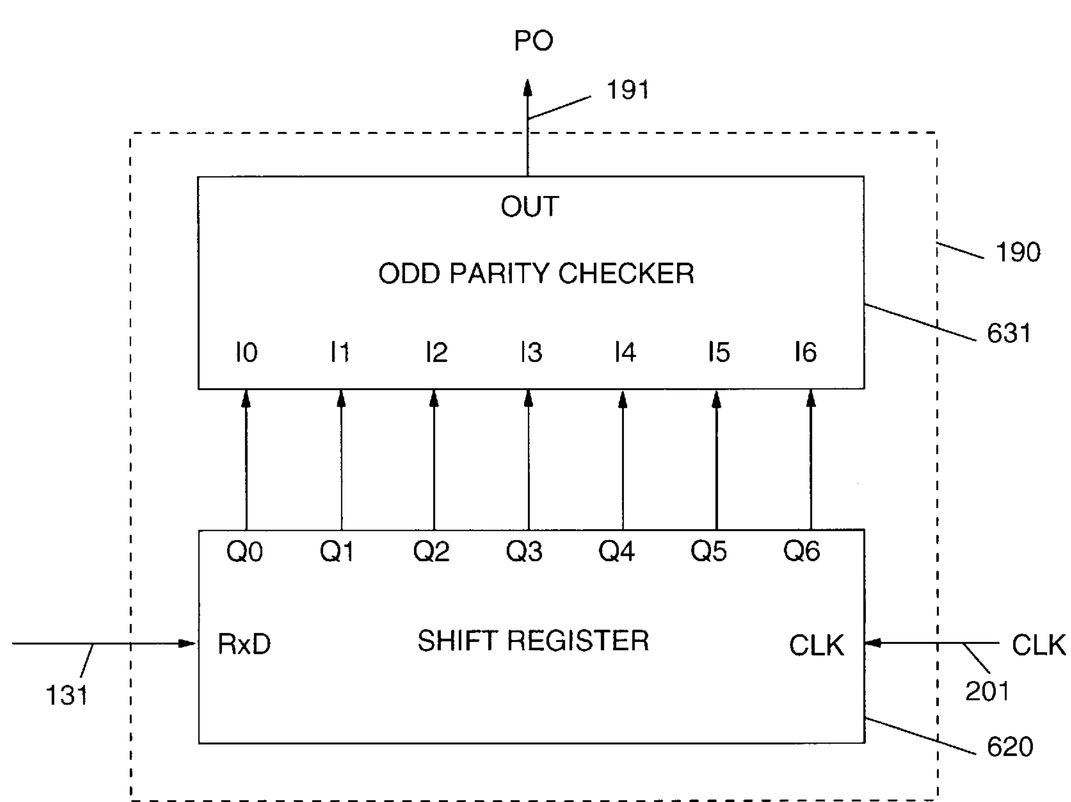
Figure 5:
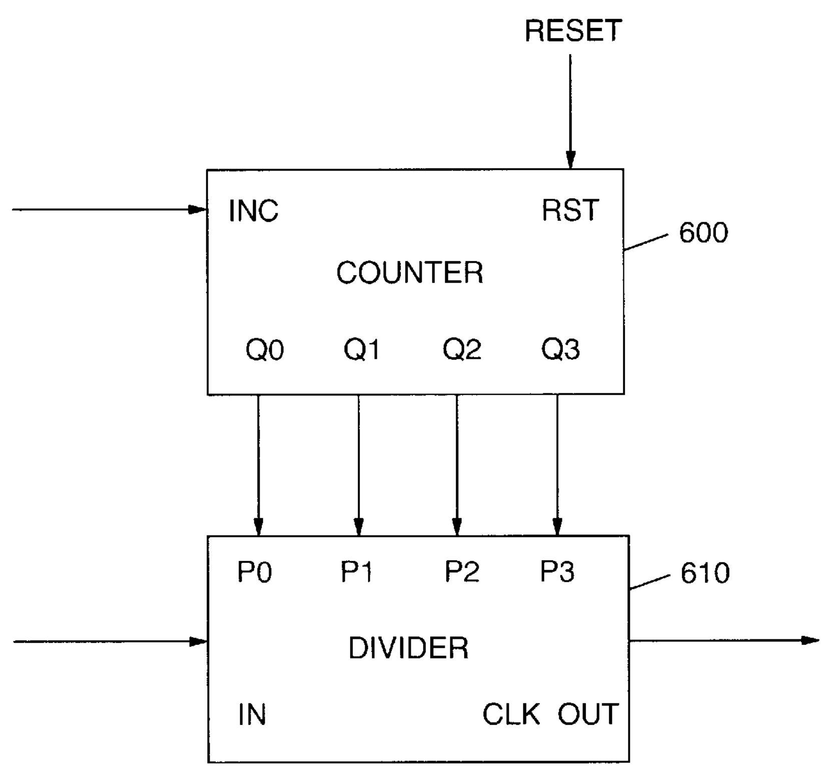
FIG. 5 represents a clock generator to be used in connection with each control circuit according to the present invention.
Figure 6:
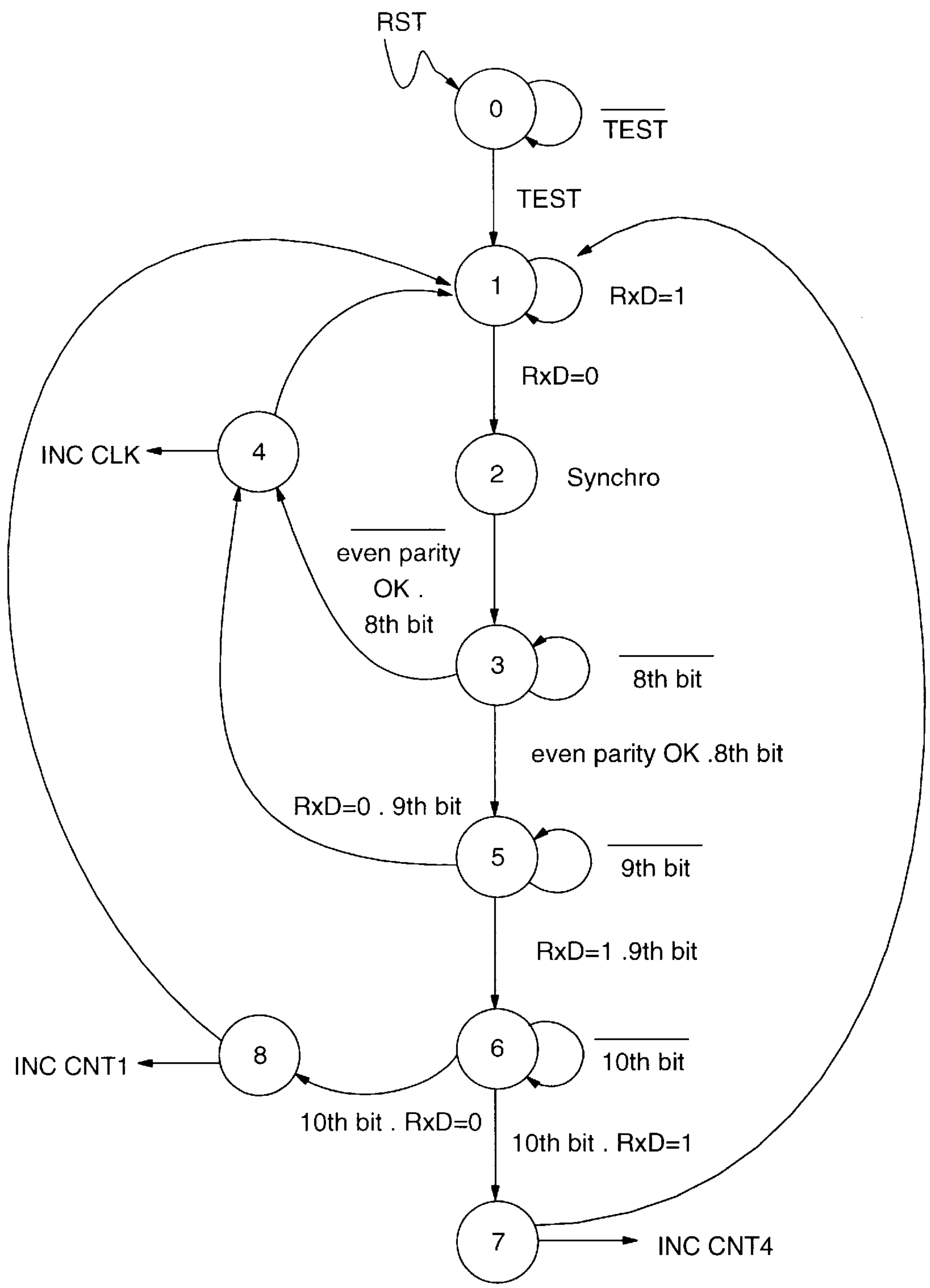
FIG. 6 shows the functional operations of a first control circuit.

The function of the first control circuit (170) is described as follows by referring to FIG. 6. The first control circuit (170) is dedicated to the detection of 7 data bits with even parity and one or two stop bits. It is reset to state 0 and is kept at this state until its Test input (102) is activated. When the Test input is activated, it goes to state 1 where it waits for the low level of RXD input (131) representing the start bit in order to go to state 2, otherwise it remains at state 1. State 2 is decoded as a synchronous output signal SYNC (171) which starts the timer (220) to synchronize the beginning of the bits counting of the asynchronous configuration link. Afterwards, the first control circuit goes to state 3 where it waits for the 8th bit time, where each clock time is given by the timer clocked at the lowest rate of 110 bps. Simultaneously, the parity checker (180) receives on its input RXD (131) the received data which go to a shift register (620) clocked by the CLK signal of the clock generator (160) though lead (161), as is represented in FIG. 3-A. The data are shifted in at the clock frequency and deserialized. In real time, an even parity checker (630) connected to the shift register calculates the parity of these seven bits and presents it on its output PE (181) to the first control circuit (170) in order to be checked at state 3. If the parity is even as expected, then it goes to state 5. If the parity is odd, then it goes to state 4 to increment the clock generator (160) on its input INC through lead (172). The clock generator (160), as is shown in FIG. 5, is composed of a counter (600) and a divider (610). Once the counter (600) receives the increment signal (172) , it sets its outputs Q0–Q3 to 1000 in order to generate them to the divider (610). This latter receives a free running clock signal from the oscillator (150) on its input IN and divides it in order to obtain a higher clock rate which is 220 bps for example. Afterwards, it loops back to state 1 where a new start bit is waited.

At state 5, in the same way, the 9th bit time is waited before testing the RXD signal. Once it is received, the RXD is tested. If it is equal to 0, it means that it is not synchronized because 1 or 2 stop bits are expected. Thus, it goes to state 4 to perform the same operations as previously described above. If the RXD signal is equal to 1, the case of 1 stop bit may occur, it goes to state 6 where the 10th bit time is waited. Once it is received, the RXD signal is tested. If it is equal to 0, which means that a configuration of one stop bit has been decoded, it goes to state 8 when decoded, increments the first counter (230) through an INC CNT1 signal (173). Afterwards, it loops back to state 1 where a new start bit is waited. If at state 6 the RXD signal is equal to 1, it represents a second stop bit. Then it goes to state 7 to increment the second counter (240) through an INC CNT2 signal (174). Then, it loops back to state 1 where a new start bit is waited.

Figure 7:
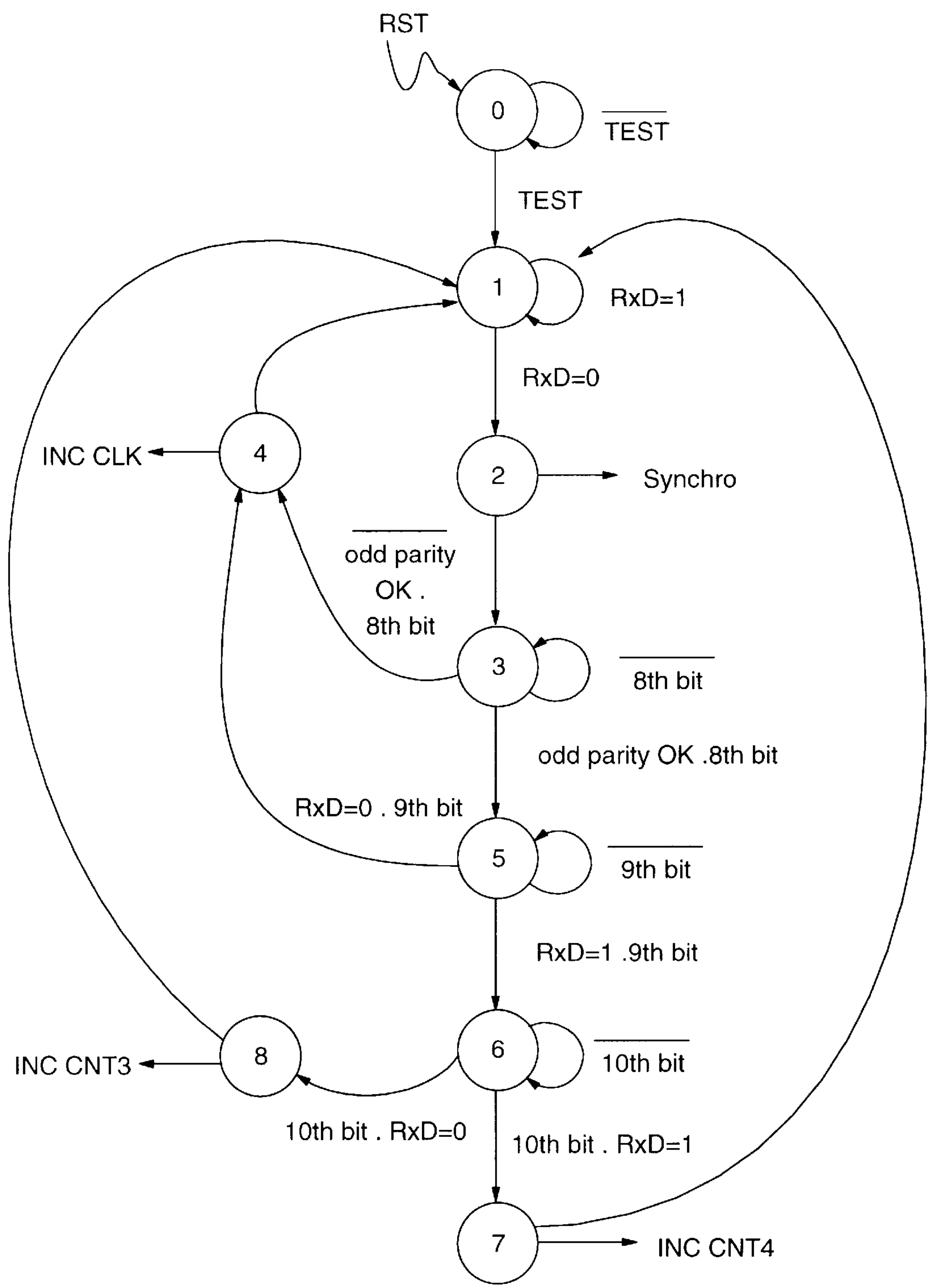
FIG. 7 shows the functional operations of a second control circuit.

The functions of the second control circuit (210) is described as follows by referring to FIG. 7. The control circuit (210) is dedicated to the detection of 7 data bits odd parity with one or two stop bits. It is reset to state 0 and is kept at this state until its test input (102) is activated. When the test input is activated, it goes to state 1 where it waits for the low level of RXD input (131) representing the start bit in order to go to state 2, otherwise (RXD high level) it remains at state 1. The state 2 is decoded as a synchronous output signal SYNC (211). This signal starts the timer (270) to synchronize the beginning of the bits counting of the asynchronous configuration link. Afterwards, the control circuit goes to state 3 where it waits for the 8th bit time, each clock time being given by the timer which is clocked at the lower rate of 110 bps. Simultaneously, the parity checker (190) receives on its input RXD (131) the receive data which enters in a shift register (621) clocked by the CLK signal of the clock generator (200) though lead (201), as is represented in FIG. 3-B. The data are shifted in at the clock frequency and deserialized. In real time, an odd parity checker (631) connected to the shift register calculates the parity of these seven bits and presents it on its output PO (191) which is connected to the control circuit (210) in order to be checked at state 3. If the parity is odd as expected, then it goes to state 5. If the parity is even, then it goes to state 4 to increment the clock generator on its input INC (200) through lead (212). The clock generator (200) is composed, like the clock generator (160), of a counter (600) and a divider (610) as is shown in FIG. 5. Once the counter (600) has received the increment signal (212), it sets its outputs Q0–Q3 to 1000 in order to generate them to the divider (610). This latter receives a free running clock signal from the oscillator (150) and divides it in order to obtain the a higher rate of clock which is 220 bps for example. Afterwards, it loops back to state 1 where a new start bit is waited.

At state 5, in the same way the 9th bit time is waited before testing the RXD signal. If the RXD is equal to 0, it means that it is not synchronized because 1 or 2 stop bits are expected. Thus, it goes to state 4 to perform the same operations as previously described above. If the RXD signal is equal to 1, the case of 1 stop bit may occur, it goes to state 6 where the 10th bit time is awaited before testing the RXD signal. If the RXD is equal to 0, which means that a configuration of one stop bit has been decoded, it goes to state 8 when decoded, increments the third counter (250) through a INC CNT3 signal (213). Afterwards, it loops back to state 1 where a new start bit is waited. If at state 6 the RXD signal is equal to 1, which represents a second stop bit. Then, it goes to state 7 to increment the fourth counter (260) through a INC CNT4 signal (214). Then, it loops back to state 1 where a new start bit is waited.

Figure 8:
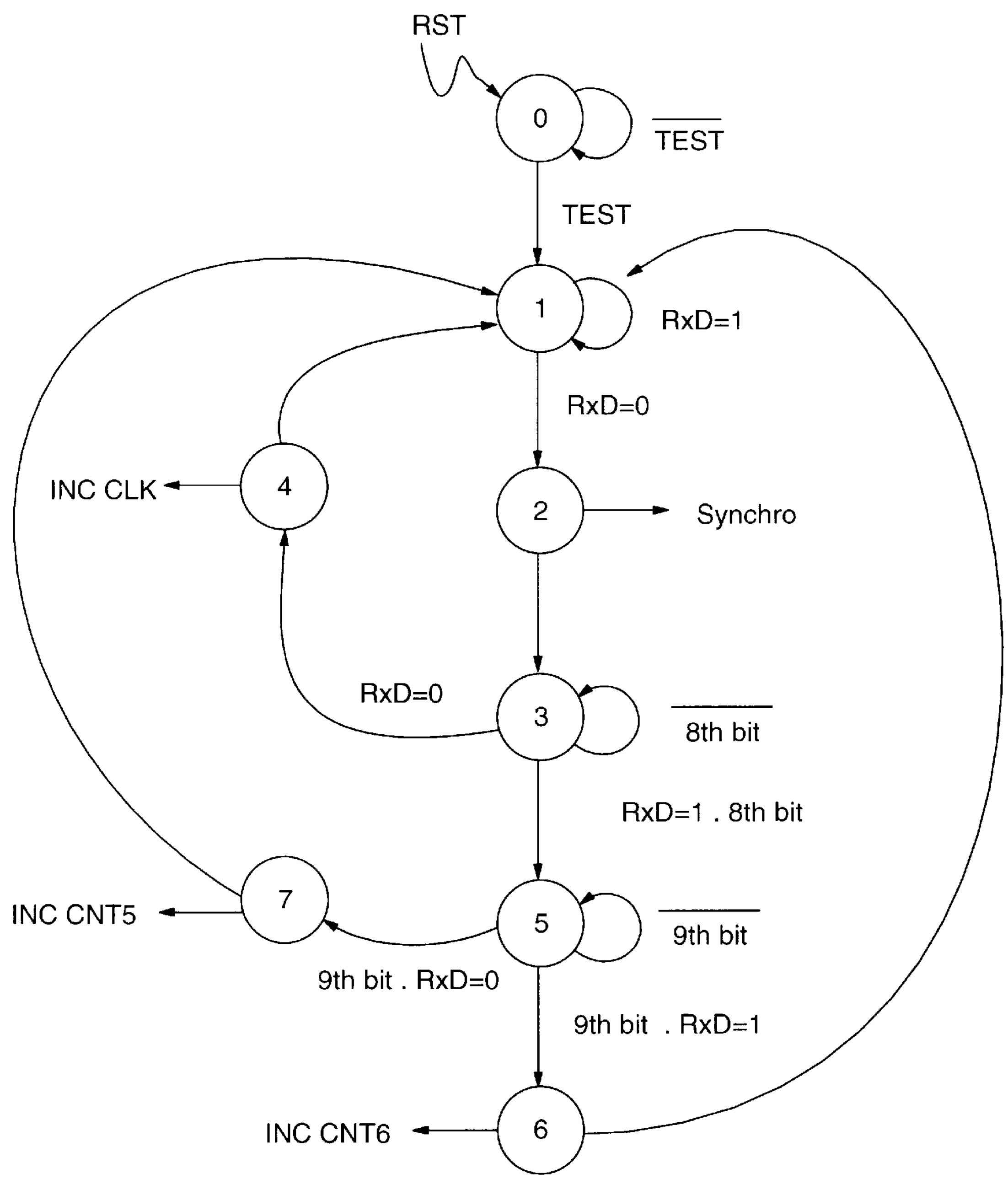
FIG. 8 shows the functional operations of a third control circuit.

The functions of the third control circuit (290) is described as follows by referring to FIG. 8. The control circuit (290) is dedicated to the detection of 7 data bits no parity with one or two stop bits. It is reset to state 0 and is kept at this state until its test input (102) is activated. When the test input is activated, it goes to state 1 where it waits for the low level of RXD input (131) representing the start bit in order to go to state 2, otherwise (RXD high level) it remains at state 1. The state 2 is decoded as a synchronous output signal SYNC (291). This signal starts the timer (300) to synchronize the beginning of the bits counting of the asynchronous configuration link. Afterwards, the control circuit goes to state 3 where it waits for the 8th bit time, each clock time is given by the timer clocked at a lower rate of 110 bps. If the RXD is equal to 0 it means that it is not synchronized because one or two stop bits are expected, then it goes to state 4 to increment the clock generator (280) on its input INC through lead (292). The clock generator (280) like the other clock generator (160,200) is composed of a counter (600) and a divider (610), as is shown in FIG. 5. Once the counter receives the increment signal (292), it sets its outputs Q0–Q3 to 1000 in order to generate them to the divider (610). This latter receives a free running clock signal from the oscillator (150) and divides it in order to obtain the another rate of clock which may be 220 bps for example. Afterwards, it loops back to state 1 where a new start bit is waited.

At state 5, in the same way the 9th bit time is awaited before testing the RXD signal (131). If the RXD signal is equal to 0, which means that a configuration of one stop bit is decoded. Thus, it goes to state 7 when decoded, increments the fifth counter (310) through a INC CNT5 signal (293). Afterwards, it loops back to state 1 where a new start bit is waited. If at state 5, the RXD signal is equal to 1, which represents a second stop bit, it goes to state 6 to increment the sixth counter (320) through an INC CNT6 signal (294). Then, it loops back to state 1 where a new start bit is waited.

Figure 4:
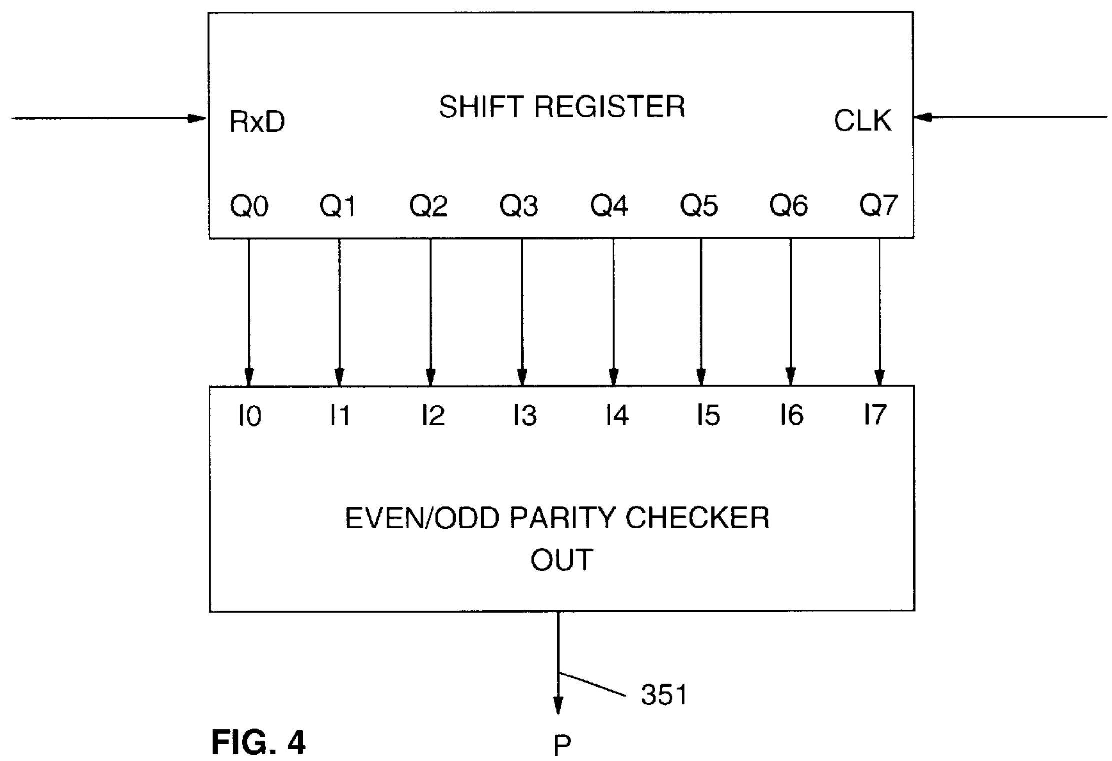
FIG. 4 represents a parity checker in the case of a 8 data bits length (even or odd).
Figure 9:
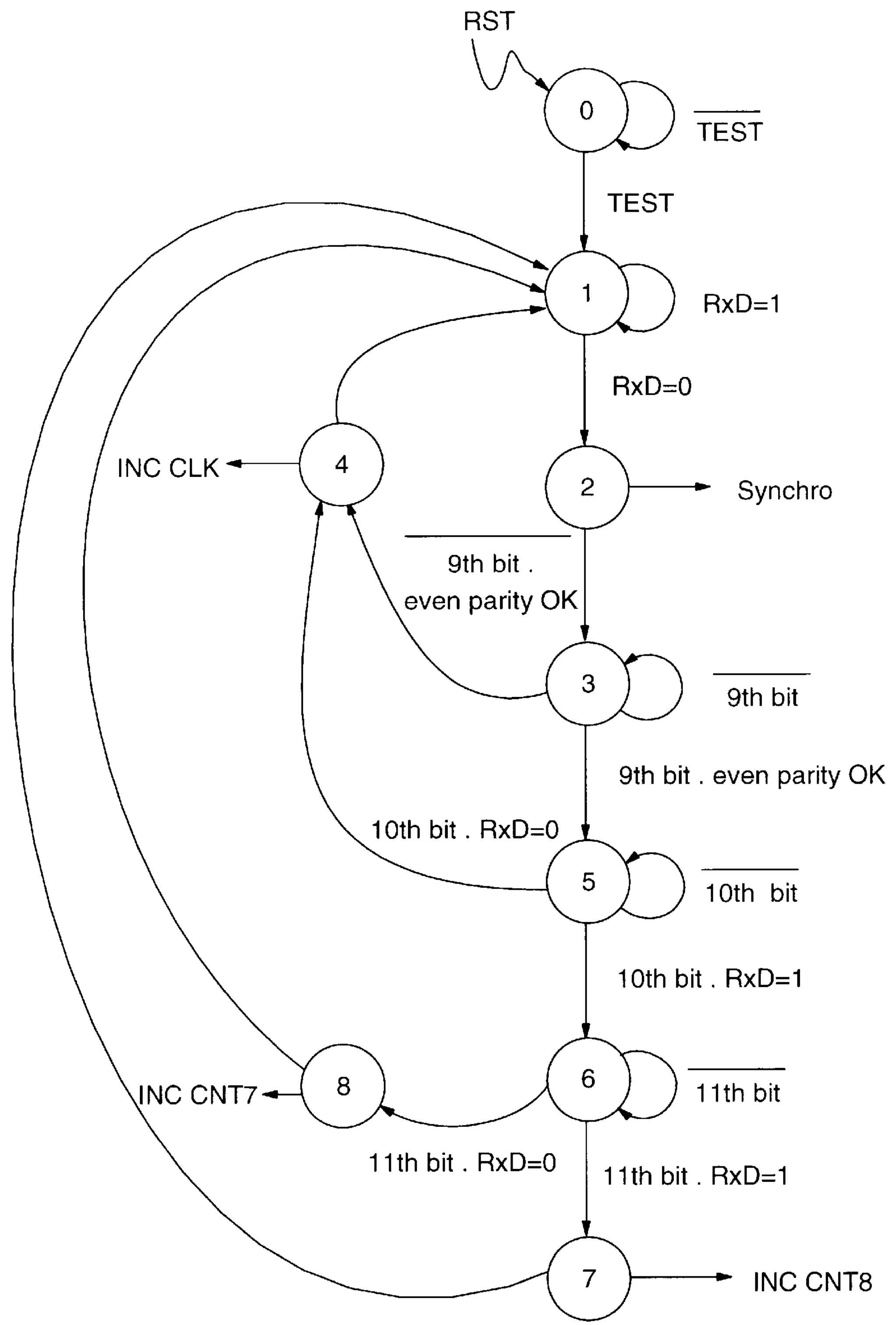
FIG. 9 shows the functional operations of a fourth control circuit.

The functions of the fourth control circuit (340) is described as follows by referring to FIG. 9. The control circuit (340) is dedicated to the detection of 8 data bits even parity with one or two stop bits. It is reset to state 0 and is kept at this state until its test input (102) is activated. When the test input is activated, it goes to state 1 where it waits for the low level of RXD input (131) representing the start bit in order to go to state 2, otherwise (RXD high level) it remains at state 1. The state 2 is decoded as a synchronous output signal SYNC (341). This signal starts the timer (380) which synchronizes the beginning of the bits counting of the asynchronous configuration link. Afterwards, the control circuit goes to state 3 where it waits for the 9th bit time, each clock time being given by the timer which is clocked at the lower rate of 110 bps. Simultaneously, the parity checker (350) receives on its input RXD (131) the receive data which enters in the D input of a shift register like the shift register (620) but of 8 bits length of the parity checker (180), as is shown in FIG. 4. The shift register is clocked by the CLK signal of the clock generator (360) though lead (361). The data are shifted-in at the clock frequency and deserialized. An even parity checker like the even parity checker (630) as shown in FIG. 4 but of 8 bits length is connected to the shift register. In real time, it calculates the parity of these eight bits and presents it on its output P (351) connected to the control circuit (340) in order to be checked at state 3.

If the parity is even as expected, it goes to state 5. If the parity is odd, it goes to state 4 to increment the clock generator (360) on its input INC through lead (342). The clock generator (360) is composed of a counter (600) and a divider (610), like the other generators as shown in FIG. 5. Once the counter has received the increment signal (342), it sets its outputs Q0–Q3 to 1000 in order to generate them to the divider (610). This latter receives a free running clock signal from the oscillator (150) and divides it in order to obtain another rate of clock which may be 220 bps for example. Afterwards, it loops back to state 1 where a new start bit is waited.

Figure 10:
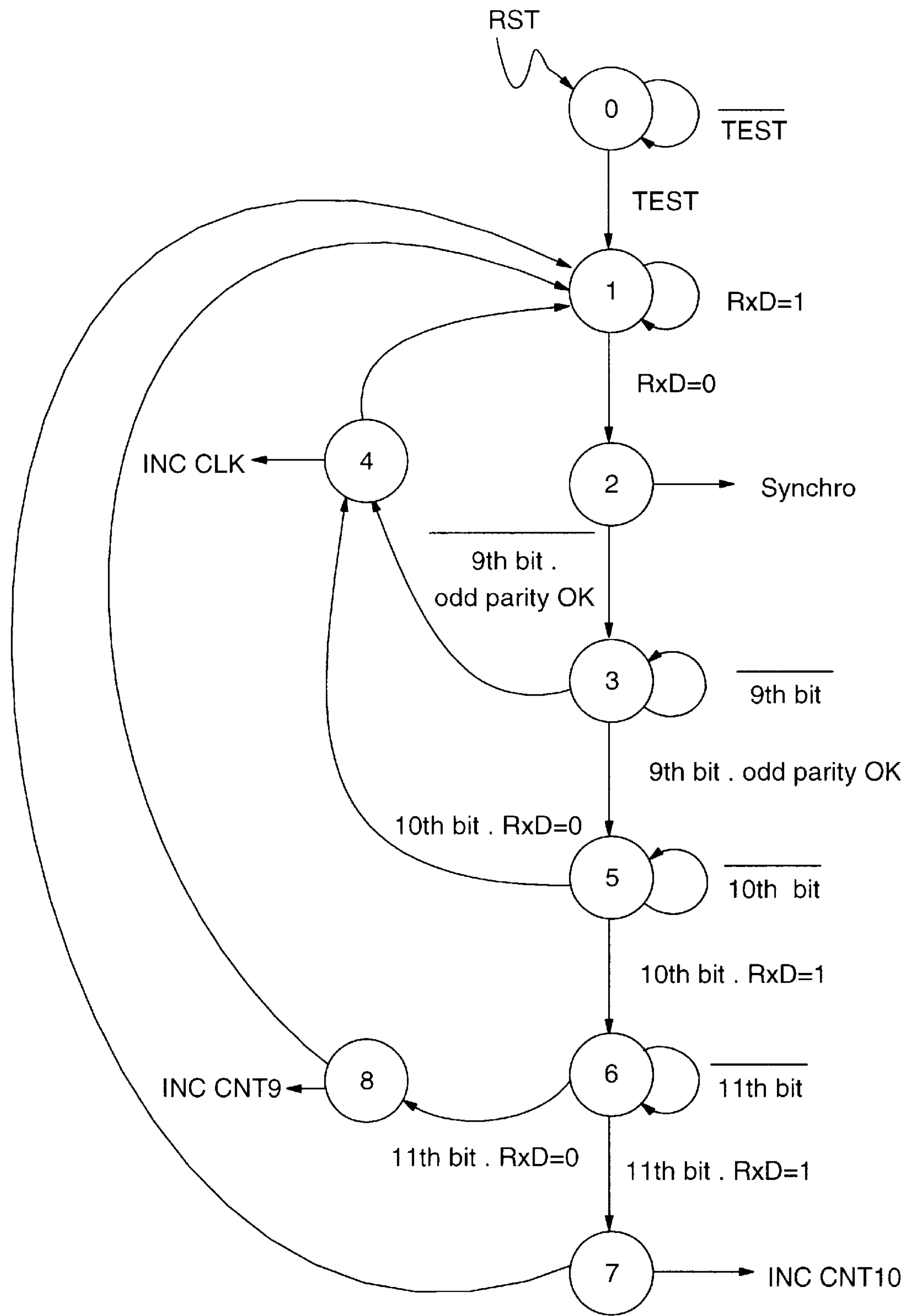
FIG. 10 shows the functional operations of a fifth control circuit.

At state 5, in the same way the 10th bit time is waited before testing the RXD signal. If the RXD signal is equal to 1, it goes to state 6. Otherwise, it goes to state 4 where it performs the operations as mentioned above. At state 6, it waits for the 11th bits to test the RXD signal. If it is equal to 0, which means a configuration of one stop bit is decoded, it goes to state 8, where the seventh counter (330)is incremented by an INC CNT7 signal (343). Then, it loops to state 1 where a new start bit is waited . At state 6, if the RXD signal is equal to 1, which corresponds to the case of 2 stop bits, it goes to state 7 to increment the eighth counter (370) through an INC CNT8 signal (344). Then, it loops back to state 1 where a new start bit is waited. The functions of the fifth control circuit (400) is described as follows by referring to FIG. 10. The control circuit (400) is dedicated to the detection of 8 data bits odd parity with one or two stop bits. It is reset to state 0 and is kept at this state until its test input (102) is activated. When the test input is activated, it goes to state 1 where it waits for the low level of RXD input (131) representing the start bit in order to go to state 2, otherwise (RXD high level) it remains at state 1. State 2 is decoded as a synchronous output signal SYNC (401) which starts the timer (440) to synchronize the beginning of the bits counting of the asynchronous configuration link. Afterwards, the fifth control circuit goes to state 3 where it waits for the 9th bit time, each clock time is given by the timer clocked at a lower rate of 110 bps. Simultaneously, the parity checker (410) receives on its input RXD (131) the received data which enters in a shift register of 8 bits length similar to the shift register (621), shown in FIG. 4. The shift register is clocked by the CLK signal of the clock generator (390) through lead (391). The data are shifted-in at the clock frequency and deserialized. An odd parity checker of 8 bits length associated with this 8 bits length shift register operates like the odd parity checker (631) shown in FIG. 4. In real time, it calculates the parity of these eight bits and presents it on its output P (411) to the control circuit (400) in order to be checked at state 3. If the parity is odd as expected, then it goes to state 5. If the parity is even, then it goes to state 4 to increment the clock generator (390) on its input INC through lead (402). The clock generator (390), like the other clock generators is composed of a counter (600) and a divider (610). Once the counter (600) receives the increment signal (402), it sets its outputs Q0–Q3 to 1000 in order to generate them to the divider (610). This latter also receives a free running clock signal from the oscillator (150) and divides it in order to obtain another rate of clock which may be 220 bps for example. Then, it loops back to state 1 where a new start bit is waited.

At state 5, in the same way the 10th bit time is waited before testing the RXD signal. If the RXD signal is equal to 0, which means that it is not synchronized because 1 or 2 stop bits are expected, it goes to state 4 and performs the operations previously described. Otherwise, it goes to state 6, where the 11th bit is waited to test the RXD signal. If the RXD signal is equal to 0, which means that the configuration of one stop bit is decoded, it goes to state 8 where it increments the ninth counter (450) through an INC CNT9 signal (403). Then, it goes to state 1 where a new start bit is waited. At state 6, if the RXD signal is equal to 1, which corresponds to the case of 2 stop bits, it goes to state 7 to increment the tenth counter (460) through an INC CNTlO signal (404). Then it loops back to state 1 where a new start bit is waited.

Figure 11:
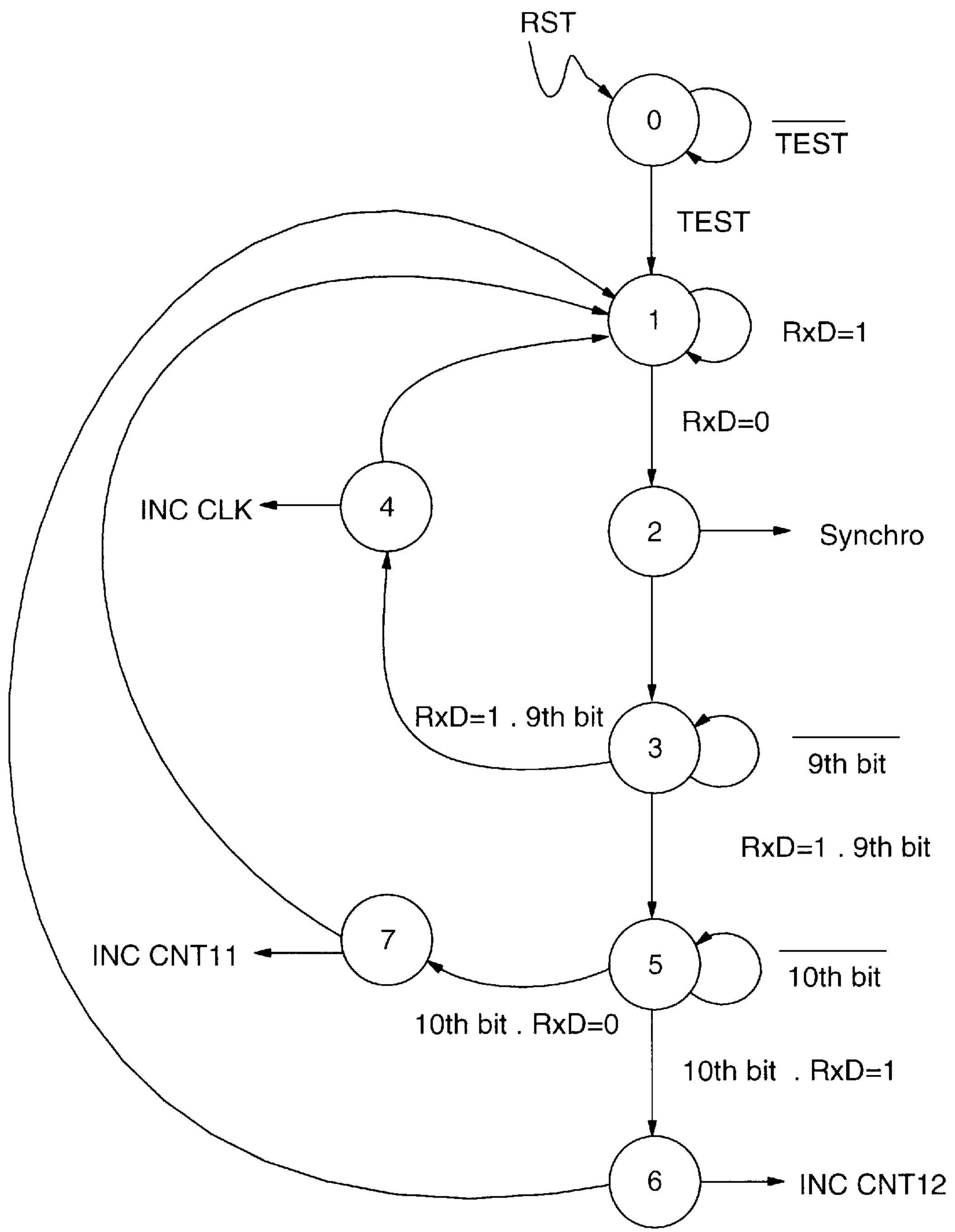
FIG. 11 shows the functional operations of a sixth control circuit.

The functions of the sixth control circuit (420) is described as follows by referring to FIG. 11. The control circuit (420) is dedicated to the detection of 8 data bits no parity with one or two stop bits. It is reset to state 0 and is kept at this state until its test input (102) is activated. When the test input is activated, it goes to state 1 where it waits for the low level of RXD input (131) representing the start bit in order to go to state 2, otherwise (RXD high level) it remains at state 1. State 2 is decoded as a synchronous output signal SYNC (421) which starts the timer (490) to synchronize the beginning of the bits counting of the asynchronous configuration link. Afterwards, the control circuit goes to state 3 where it waits for the 9th bit time, each clock time is given by the timer clocked at a lower rate of 110 bps. If the RXD is equal to 0, it means that it is not synchronized because one or two stop bits are expected, then it goes to state 4 to increment the clock generator (430) on its input INC through lead (422). The clock generator (430) like the other clock generator (160,200) is composed of a counter (600) and a divider (610), as is shown in FIG. 5. Once the counter has received the increment (422), it sets its outputs Q0–Q3 to 1000 in order to generate them to the divider (610). This latter receives a free running clock signal from the oscillator (150) and divides it in order to obtain the another rate of clock which may be 220 bps for example. Afterwards, it loops back to state 1 where a new start bit is waited.

At state 5, in the same way the 10th bit time is waited before testing the RXD signal (131). If the RXD signal is equal to 0, which means that the configuration corresponds to the case of 1 stop bit, it goes to state 7 to increment the eleventh counter (470) through an INC CNT11 signal (423). Afterwards, it loops back to state 1 where a new start bit is waited. If at state 5, the RXD signal is equal to 1, which corresponds to a second stop bit, it goes to state 6 to increment the twelfth counter (480) through an INC CNT12 signal (424). Then, it loops back to state 1 where a new start bit is waited.

All these state machines may operate serially by implementing in series the six blocks of components, each one dedicated to a unique configuration, or simultaneously by implementing in parallel the six blocks as is shown in FIG. 2.

The second case is possible owing to the serial asynchronous data signal RXD (131) which is connected to these six blocks. As soon as one of the twelve counters reach the number 10, its overflow output (0V) is set to one. These overflow outputs are respectively connected to input pins IN1–12 of the microcontroller (100). For instance, overflow pin of the first counter (230) is connected to input pin IN1, etc. . . . These input pins are regularly polled by the microcontroller so that this latter is aware of which counter has reached the number 10 first. Then, the microcontroller reads the code value of the clock generator C0–C3 corresponding to said counter. As an illustration, the clock generator (160) is associated to the first and second counters (230,240). Since the code value C0–C3 is associated to a defined speed of the asynchronous communication link, the microcontroller programs its internal UART (universal asynchronous receiver transmitter) according to this defined speed and to the defined parameters corresponding to the twelve counters. Once the UART is programmed, the microcontroller set its output pin OUT1 to 1 in order to reset all the counters and the control circuits. And by the way, the clock generators are reset to their lowest speed 110 bps. After reset, the peripheral (110) begins the transmission with the microcontroller through the DMA.

Figure 12:
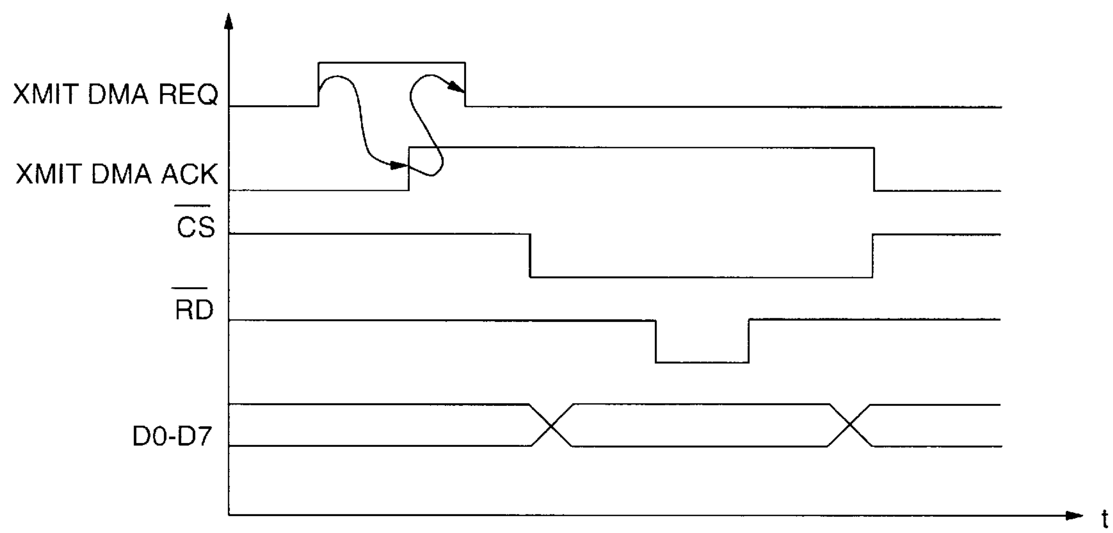
FIGS. 12 and 13 shows timing diagrams of the read and write operations between a peripheral and a microcontroller according to the present invention.

By referring to FIG. 12 which shows the timing diagram of a read operation, the DMA sends its XMIT_DMA_REQ signal to the microcontroller on its pin DMA_REQ1. This latter returns the XMIT_DMA_ACK signal from its pin DMA_ACK1. Then, the peripheral receives the chip select signal CS and the read signal RD, and the microcontroller starts reading the data from the peripheral on a bidirectional bus (105). Each received byte is internally transferred to a XMIT part of the UART and sent through pin TXD to the connector (120) via a driver (140) according to the configuration parameters previously found.

Figure 13:
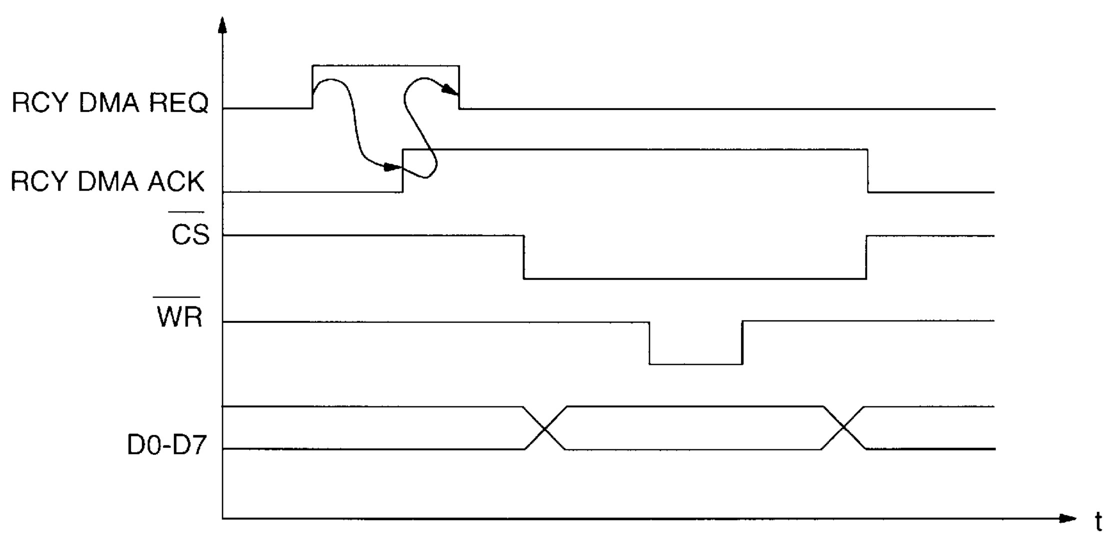

Conversely, as is shown in FIG. 13, the data received by the microcontroller on its pin RXD from the receiver (130) cause an internal interrupt inside the microcontroller which is then allowed to receive the RCV_DMA_REQ signal on its pin DMA_REQ2. Afterwards, its returns a RCV_DMA_ACK signal from its pin DMA_ACK2. Then the peripheral receives the chip select signal CS and the write signal WR and the microcontroller writes the data from the peripheral on the bidirectional bus (105) and the operations are repeated until the end of the communication.

We claim:

1. An asynchronous interface apparatus comprising a microcontroller connected to an asynchronous device through an asynchronous data link and including an adapter for automatically adapting an asynchronous communication data flow between said microcontroller and the asynchronous device, said adapter including logical circuitry for receiving an input signal from said asynchronous device, for analyzing the input signal to automatically identify configuration parameters of the asynchronous data link, and for providing the identified configuration parameters to said microcontroller for adapting communication with the asynchronous device said logical circuitry having at least one control system for monitoring the input signal received from the asynchronous device to detect a number of data bits, a parity type and a number of stop bits per data character in the asynchronous communication data flow, each said control system including:

a control circuit receiving the input signal;

a clock generator for providing a clock signal to said control circuit and for varying the frequency of said clock signal responsive to a signal from said control circuit to enable said control circuit to detect a transmission speed on the asynchronous data link;

a timer circuit controlled by said control circuit for synchronizing bit counting of the communication data flow so as to identify the number of data bits per character;

a parity checker for calculating the parity of the data bits, the calculated parity being transmitted to said control circuit to validate a parity type; and a plurality of counters driven by said control circuit for counting the number of times an identified configuration of parameters containing one or two stop bits is detected so as to validate an identified configuration and to generate a valid configuration signal for delivery to said microcontroller indicating that a valid configuration has been detected by said logical circuitry.

2. The asynchronous interface apparatus according to claim 1, wherein each said control system is dedicated to the detection of a specific different set of configuration parameters.

3. The asynchronous interface apparatus according to claim 2, wherein each said control system receives the input signal from the asynchronous device and transmits any valid configuration signal to the microcontroller.

4. The asynchronous interface apparatus according to any one of claims 1–3, wherein the configuration parameters comprise:

said number of data bits being in a range between 7 and 12;

said parity type which can be either odd, even, or none;

said number of stop bits which can be either one or two; and said transmission speed being in a range between 110 bits per second and 19200 bits per second.

5. The asynchronous interface apparatus according to claim 2, wherein said at least one control system includes:

a first control system for detecting, in said asynchronous communication data flows 7 data bits with even parity, and one or two stop bits;

a second control system for detecting, in said asynchronous communication data flow, 7 data bits with odd parity, and one or two stop bits;

a third control system for detecting, in said asynchronous communication data flow, 7 data bits with no parity, and one or two stop bits;

a fourth control system for detecting, in said asynchronous communication data flow, 8 data bits with even parity, and one or two stop bits;

a fifth control system for detecting, in said asynchronous communication data flows, 8 data bits with odd parity, and one or two stop bits; and a sixth control system for detecting, in said asynchronous communication data flow, 8 data bits with no parity, and one or two stop bits.

6. An asynchronous device including an asynchronous interface apparatus comprising a microcontroller connected to the asynchronous device through an asynchronous data link and including an adapter for automatically adapting an asynchronous communication data flow between said microcontroller and the asynchronous device, said adapter including logical circuitry for receiving an input signal from said asynchronous device, for analyzing the input signal to automatically identify configuration parameters of the asynchronous data link, and for providing the identified configuration parameters to said microcontroller for adapting communication with the asynchronous device, said logical circuitry having at least one control system for monitoring the input signal received from the asynchronous device to detect a number of data bits, a parity type and a number of stop bits per character in the asynchronous communication data flow, each said control system including:

a control circuit receiving the input signal;

a clock generator for providing a clock signal to said control circuit and for varying the frequency of said clock signal responsive to a signal from said control circuit to enable said control circuit to detect a transmission speed on the asynchronous data link;

a timer circuit controlled by said control circuit for synchronizing bit counting of the communication data flow so as to identify the number of data bits per character;

a parity checker for calculating the parity of the data bits, the calculated parity being transmitted to said control circuit to validate a parity type; and a plurality of counters driven by said control circuit for counting the number of times an identified configuration of parameters containing one or two stop bits is detected so as to validate an identified configuration and to generate a valid configuration signal for delivery to said microcontroller indicating that a valid configuration has been detected by said logical circuitry.

* * * * *